United States Patent [19]
Davis

[11] Patent Number: 5,384,979
[45] Date of Patent: Jan. 31, 1995

[54] FISHING LURE

[75] Inventor: Jack Davis, Crescent City, Fla.

[73] Assignee: Mann's Bait Company, Eufaula, Ala.

[21] Appl. No.: 181,435

[22] Filed: Jan. 14, 1994

[51] Int. Cl.[6] .............................................. A01K 85/00
[52] U.S. Cl. .................................... 43/42.18; 43/42.5
[58] Field of Search ................. 43/42.11, 42.15, 42.18, 43/42.5, 42.13, 42.14, 42.16, 42.28, 42.34

[56] References Cited

U.S. PATENT DOCUMENTS

| | | |
|---|---|---|
| D. 158,012 | 4/1950 | Rice . |
| D. 203,192 | 12/1965 | Hiatt . |
| D. 281,191 | 10/1985 | Marx, Jr. . |
| 728,360 | 5/1903 | Breidenstein ........................ 43/42.5 |
| 857,883 | 6/1907 | Kreisser . |
| 1,856,649 | 5/1932 | Mapel ................................. 43/42.5 |
| 2,032,819 | 3/1936 | Tengel . |
| 2,037,310 | 4/1936 | Bryan . |
| 2,235,000 | 3/1941 | Albers ................................ 43/42.5 |
| 2,595,168 | 4/1952 | Roth . |
| 2,800,739 | 7/1957 | Manzi ................................. 43/42.5 |
| 2,805,512 | 9/1957 | Bunce . |
| 3,146,542 | 9/1964 | Davis . |
| 3,492,755 | 2/1970 | Sundblad . |
| 4,713,906 | 12/1987 | Distaffen ............................ 43/42.5 |

FOREIGN PATENT DOCUMENTS

| | | | |
|---|---|---|---|
| 59398 | 5/1913 | Australia .......................... 43/42.15 |
| 482282 | 4/1952 | Canada ............................. 43/42.5 |

Primary Examiner—P. Austin Bradley
Assistant Examiner—James Miner
Attorney, Agent, or Firm—Bacon & Thomas

[57] ABSTRACT

A spoon-type artificial fish lure includes three aligned sections pivotally connected together for relative pivotal movement by laterally spaced connectors. The front section is generally triangular having an upwardly cupped front portion and a flat rear portion. The middle section has an upwardly curved profile so that it forms a section of a cylinder curved about an axis of curvature extending longitudinally above and along the axis of the lure. The rear section is upwardly curved like the middle section. The connectors connecting the middle and rear sections are laterally closer together than the connectors joining the front and middle sections. The result is a lure that undulates rapidly in a single plane (i.e., up and down) without spinning when moving through water.

8 Claims, 2 Drawing Sheets

FISHING LURE

BACKGROUND OF THE INVENTION

1. Field of the Invention

This invention relates to artificial fishing lures.

2. Discussion of Prior Art

Multi-section spoon type lures are generally known in the prior art, as exemplified, for example, by U.S. Pat. No. 2,032,819, U.S. Pat. No. Des. 15801, U.S. Pat. No. 2,595,168, U.S. Pat. No. 2,805,512, U.S. Pat. No. 2,037,310 and U.S. Pat. No. Des. 281,191. As is typical of these type of lures, the object is to draw the attention of nearby fish by the action of the lure as it is drawn through water following a cast by a fisherman or while the fisherman is trolling. Such prior art lures include flattened, bent and curved sections of various forms to promote movement of the various sections of the lure in accordance with the hydrodynamic forces exerted on the lure as it moves relative to surrounding water.

BRIEF SUMMARY OF THE INVENTION

The present invention is a spoon type lure formed from relatively rigid sheet material in three sections connected together by pivot connectors, such as circular rings. The front section of the lure is generally triangular in form and includes a flat rear section and a flat trailing edge disposed adjacent the leading edge of the middle section which is upwardly curved transversely to generally form the section of a cylinder having its axis of curvature extending axially above and along the lure. The rear section of the lure likewise is connected to the trailing edge of the middle section and is also curved upwardly like the middle section to form a generally cylindrical section having its axis of curvature corresponding to the axis of curvature of the middle section. The middle and rear sections are connected together by rings that are spaced apart closer than the lateral spacing of the rings connecting the front and middle sections of the lure.

The total effect of the lure design is that the lure undulates rapidly while it is drawn through water and does not spin about its longitudinal axis. Rather, the lure rapidly undulates while remaining generally horizontal as it is retrieved or while it is drawn through the water during trolling.

BRIEF DESCRIPTION OF THE DRAWINGS

With reference to the appended drawings illustrating a preferred embodiment of the invention.

DETAILED DESCRIPTION OF A PREFERRED EMBODIMENT OF THE INVENTION

Figure 1:
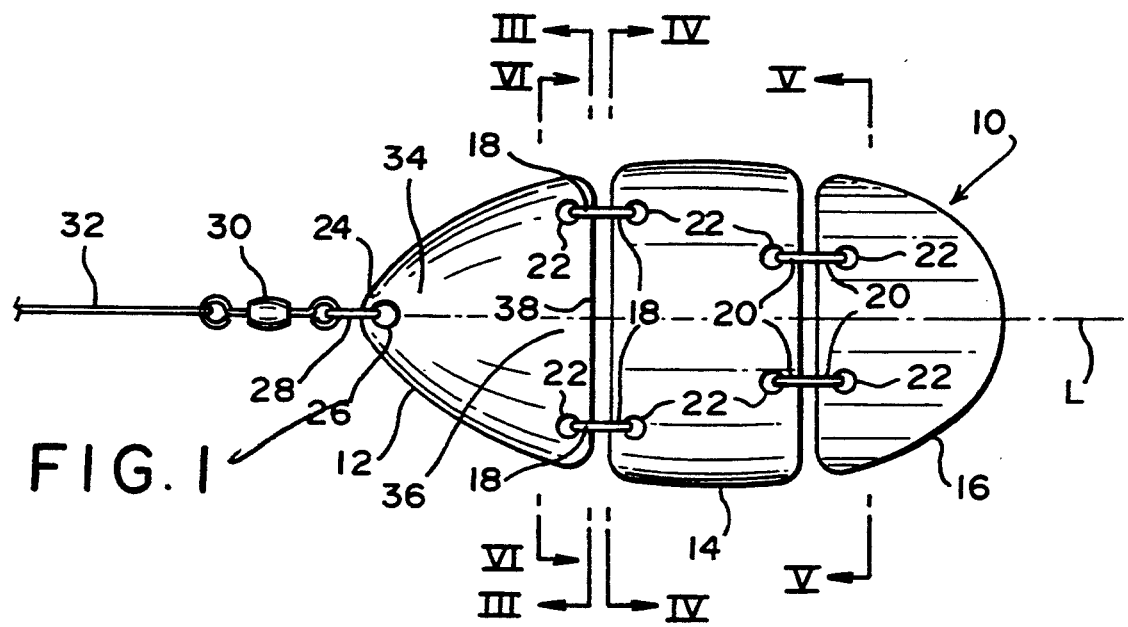
FIG. 1 is a top plan view of the lure constructed in accordance with the invention.

With reference to FIG. 1, a fish lure 10 constructed in accordance with the invention comprises three sections 12, 14 and 16 connected together axially along the length of the lure for relative pivotal movement by laterally spaced pairs of ring connectors 18, 20 extending through apertures 22 located near opposed edges of the adjacent sections 12, 14 and 16. The lure is symmetrical about its longitudinal or axial central axis L. The connectors 18 connecting the front and middle sections 12, 14 are laterally spaced further apart than the connectors 20 connecting the middle and rear sections 14, 16. The overall configuration of the lure, as viewed in plan as shown in FIG. 1, is generally oval, with the front section 12 being generally triangular in shape converging to an apex 24 where an aperture 26 is provided to accommodate a line tie 28 which in accordance with this embodiment is a circular ring. An appropriate pivot link 30 may also be provided between a line or other connection 32 and lure 10.

The lure 10 preferably is formed of bent sheet metal such as stainless steel or other suitable material capable of retaining a shape after it has been formed and during use. Each opposed edge of sections 12, 14 and 16 is located closely together.

Figure 2:
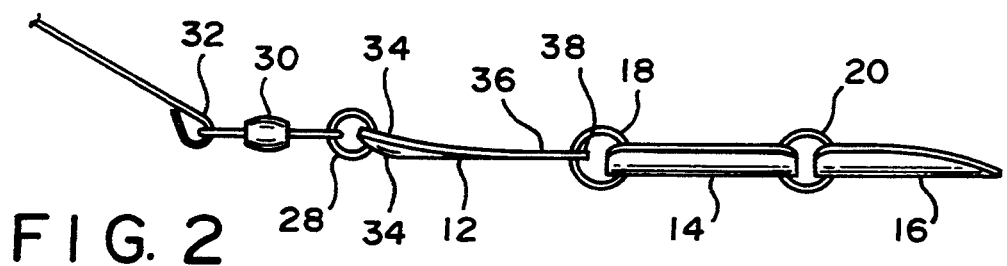
FIG. 2 is a side elevational view of FIG. 1.
Figure 3:
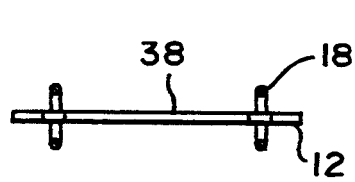
FIGS. 3–6 are sectional views taken along lines III--III, IV–IV, V–V and VI–VI, respectively of FIG. 1.

The front section 12 is formed to have a generally cup shaped front end portion 34 (i.e., upwardly curved side edge areas) as seen in FIGS. 1 and 2 and a flat or substantially planar rear edge portion 36 including flat or substantially planar edge 38 as shown in FIG. 3.

Figure 4:
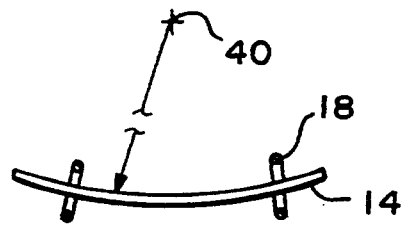
Figure 5:
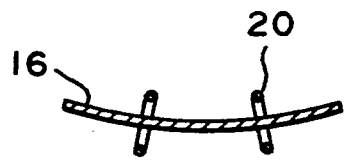

Middle section 14 is curved upwardly generally in form of a section of a cylinder about an axis of curvature 40 extending longitudinally above the lure as depicted in FIG. 4. Likewise, rear section 16 is also bent upwardly to form generally a section of a cylinder having the same axis of curvature as section 14, as shown in FIG. 5. As so bent, the front edge portion of the middle section is bent downwardly out of the plane of the planar rear edge portion 36 of front section 12, as observable in FIG. 6.

Figure 6:
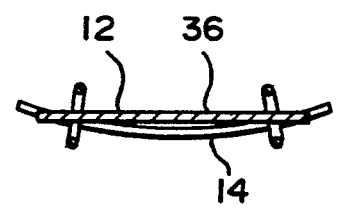

Thus, as seen in FIG. 6, the intersection area between the front section 12 and the middle section 14 comprises flat section 36 including flat edge 38 and the upwardly curved front edge of middle section 14 when the sections 12 and 14 are axially aligned.

Since middle section 14 and rear section 16 are curved about the same radius of curvature, their adjacent edges will extend transversely parallel and adjacent each other.

A preferred embodiment of the invention has been constructed as follows: Three sections of stainless steel sheet having a thickness of 0.020 inch were formed as shown in the drawings appended hereto. The middle and rear sections were bent about an axis of curvature having its center 2¾ inch from above the central axis of the lure. The front set of apertures 22 in section 14 for receiving connectors 18 were located inboard of the lateral edges of the middle section 0.2 inch and the diameter of the apertures was 0.11 inch. Each aperture 22 in the middle section 14 was centered 0.125 inch from the front and rear edges of the middle section.

The apertures 22 in section 14 for receiving the rear connectors 20 were the same size as apertures 22 in middle section 14 for receiving connectors 18, but were located inboard of the side edges of middle section 14 by 0.375 inch. The inner diameters of the ring connectors 18, 20 was 0.25 inch resulting in a spacing between the front and middle sections 12, 14 of about 0.0625 inch and between the middle and rear sections of about the same magnitude. The corresponding openings 22 in the front and rear sections 12, 16 were aligned with the openings 22 of the middle section 14 when the three sections were aligned axially and were located 0.125 inch from the respective rear edge 38 and the front edge of the rear section 16.

As measured along the longitudinal axis L of the lure, the length of the front section was 0.875 inch, the middle section was 0.875 inches long and the length of the rear section was 0.8 inch.

The maximum width of the front section along the flat edge 38 was 1.19 inch and the width of the middle section was 1.28 inch. The maximum width of the rear section adjacent its forward edge was 1.16 inch.

The forward end of the front section 12 was cupped upwardly slightly in front of the flat portion 36 with the depth of the cupped area at its deepest portion being on the order of 0.06 inch.

When the lure constructed in accordance with the aforesaid description was pulled through water, the lure did not spin, but undulated in rapid fashion up and down while it remained horizontal in the water. The undulating action emulates movement of a dolphin or whale in water, only is more rapid. The theory of the lure's action is as follows.

Figure 7:
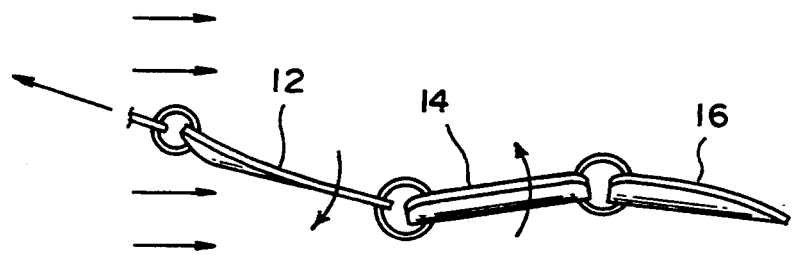
FIGS. 7 and 8 are side elevational views of the lure in action when pulled through water.

When the lure is first dropped into the water at the end of a cast, the lure will be in the position approximately as shown in FIG. 2 as the line is tensioned. That is, the three sections 12, 14 and 16 will be generally aligned as the lure first starts to be drawn through the water slowly. As the speed of the lure through the water increases, the straight trailing edge 38 of the front section 12 of the lure interacts with the upwardly curved leading edge of the middle section 14 of the lure resulting in a scooping action of the curved edge of section 14 that immediately causes the middle section 14 to want to dive in the water as shown in FIG. 7. This pulls down the rear edge 38 of the front section 12 and raises the front end of the rear section 16, again as shown in FIG. 7. This occurs with great intensity due to the scooping effect of the front edge of the middle section 14 as it interacts with the water passing over and under the flat rear section 36 of the front section 12. Rear section 16 stabilizes the middle section 14 and tends to lag in following the movement of the middle section 14.

Figure 8:
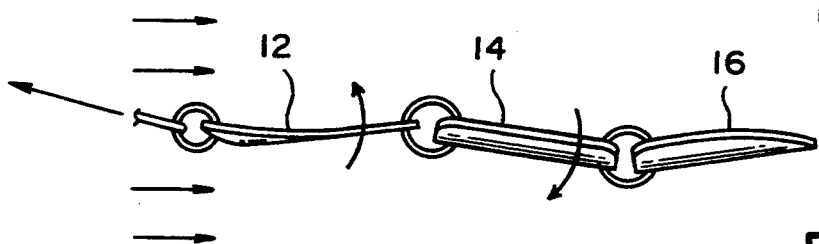

As the rear edge of the front section 12 dips under the influence of the diving middle section 14, it encounters resistance in the water tending to limit its downward rotational movement and eventually the rear section 16 pivots upwardly due to the resistance it is encountering in the water along its bottom surface which tends to drag the rear end of the middle section back into line with the front section 12. The total effect is that the rear end of middle section 14 dips down in the water as shown in FIG. 8 with rear section 16 lagging behind until the force of the water under the middle section 14 brings it back into line with the rear end of front section 12, whereupon the initial action is repeated. This entire undulation motion is repeated rapidly as the lure is retrieved in the water by a fisherman.

Placement of the ring connectors 18 outboard of the rear connectors 20 enhances the undulation motion by literally causing the middle section 14 to pivot "uphill" relative to the ring connectors.

The total effect is vigorous undulation motion without spinning of the lure while the lure essentially remains in a flat horizontal position as it is retrieved through the water.

Figure 9:
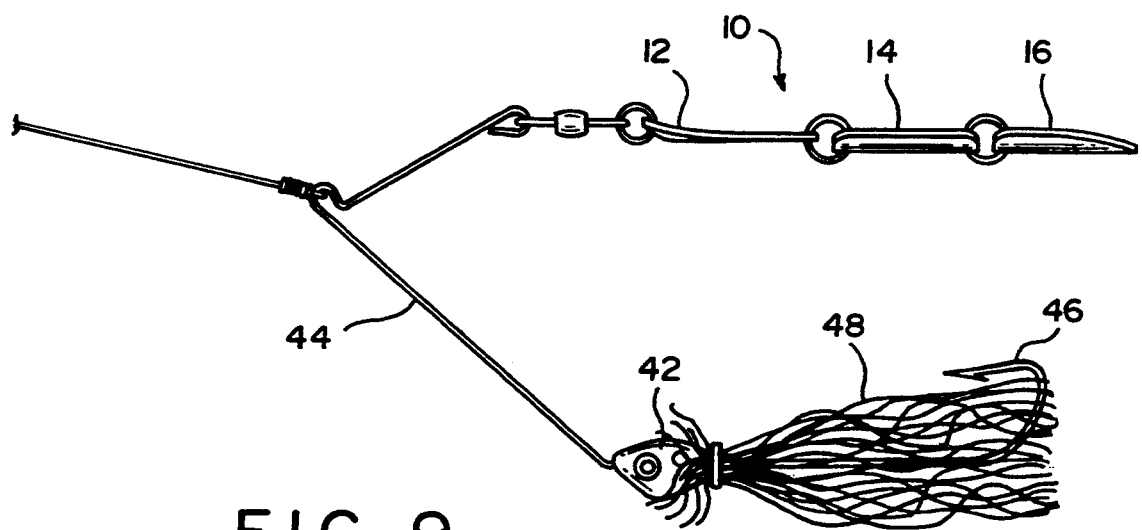
FIG. 9 shows the lure 10 rigged as a combination lure with a weight and hook.

It is to be noted that the undulation motion described previously occurs as the lure drops through the water when it is first cast. That is, when the lure is cast into the water with a weight and hook as shown in FIG. 9 described below, the lure tends to drop vertically as it is towed from its front edge by the weight and lure attached to rod 44 shown in FIG. 9. As it moves downwardly vertically through the water, the relative flow of water past the lure will have the same effect as when the lure is retrieved by tension applied to the fish line, thereby immediately attracting nearby fish due to the movement of the sections 12, 14 and 16.

FIG. 9 illustrates the lure 10 used in combination with a weight and lure 42 which is connected to the lure 10 by a connector wire 44 and including flexible strip elements 48 and fish hook 46. When used in this type of combination, the lure 10 will undulate up and down very rapidly closely adjacent and above the lure 42 without interfering with the action of the lure 42.

While the preferred embodiment has been described, it is to be understood that minor variations can be made without departing from the spirit and scope of the invention, which is limited solely by the appended claims.

I claim:

1. A fish lure comprising:
   at least three sections formed from relatively rigid sheet material, said sections extending axially along the longitudinal central lure axis in closely spaced relationship and comprising a front, middle and rear section;
   laterally spaced apertures in each section located near opposed edges of said adjacent sections, said apertures in adjacent sections being generally axially aligned when the sections are generally axially aligned;
   connectors extending through the apertures for pivotally connecting adjacent sections of the lure to each other;
   said front section having a rear edge portion adjacent a front edge portion of the middle section, said rear edge portion being substantially planar across its width;
   said middle and rear sections each having front edge portions, with at least the front edge portion of the middle section being transversely bent to generally form a section of a cylinder having its axis of curvature extending longitudinally above and along the lure.

2. The lure as claimed in claim 1, wherein the apertures for receiving the connectors located at the adjacent edges of the front and middle sections are laterally spaced apart further than the apertures at the adjacent edges of the middle and rear sections.

3. The lure as claimed in claim 1 or 2 wherein the forward portion of the front section is cupped upwardly.

4. The lure as claimed in claim 1 or 2, wherein the outer contour of the lure is generally oval, the front section is generally triangular when viewed in plan, with the front portion of the front section converging to a front tip or apex; and an aperture at the front tip for receiving a line tie, wherein the rear of the front section, including the rear edge portion thereof, forms the widest section of the front section.

5. A fish lure comprising:
   at least three sections formed from relatively rigid sheet material, said sections extending axially along the longitudinal central lure axis in closely spaced relationship and comprising a front, middle and rear section;

laterally spaced apertures in adjacent sections located near opposed edges of said adjacent sections, said apertures in adjacent sections being generally axially aligned when the sections are generally axially aligned;

connectors extending through the apertures for pivotally connecting adjacent sections of the lure to each other;

said front section having a rear edge portion adjacent the front edge portion of the middle section, said rear edge portion being substantially planar across its width;

said middle and rear sections each having front edge portions, with at least the front edge portion of the middle section being transversely bent downwardly out of the plane including said planar rear edge portion of said front section.

6. The lure as claimed in claim 5, wherein the apertures for receiving the connectors located at the adjacent edges of the front and middle sections are laterally spaced apart further than the apertures at the adjacent edges of the middle and rear sections.

7. The lure as claimed in claim 5 or 6 wherein the forward portion of the front section is cupped upwardly.

8. The lure as claimed in claim 5 or 6, wherein the outer contour of the lure is generally oval, the front section is generally triangular when viewed in plan, with the front portion of the front section converging to a front tip or apex; and an aperture at the front tip for receiving a line tie, wherein the rear of the front section, including the rear edge portion thereof, forms the widest section of the front section.

* * * * *